(12) United States Patent
Goossens et al.

(10) Patent No.: US 6,776,391 B1
(45) Date of Patent: Aug. 17, 2004

(54) ELECTROMAGNET VALVE

(75) Inventors: Andre F. L. Goossens, Rumst (BE); Luc van Himme, Zaffelare (BE)

(73) Assignee: Continental Teves AG & Co. OHG, Frankfurt (DE)

( * ) Notice: Subject to any disclaimer, the term of this patent is extended or adjusted under 35 U.S.C. 154(b) by 112 days.

(21) Appl. No.: 10/129,639

(22) PCT Filed: Nov. 11, 2000

(86) PCT No.: PCT/EP00/11177

§ 371 (c)(1),
(2), (4) Date: May 7, 2002

(87) PCT Pub. No.: WO01/36242

PCT Pub. Date: May 25, 2001

(30) Foreign Application Priority Data

| Nov. 16, 1999 | (DE) | 199 54 951 |
| Dec. 7, 1999 | (DE) | 199 58 822 |
| Apr. 4, 2000 | (DE) | 100 16 600 |

(51) Int. Cl.[7] .......................................... F16K 31/02
(52) U.S. Cl. ................................ 251/129.15; 251/337
(58) Field of Search ..................... 251/129.15, 129.01, 251/337

(56) References Cited

U.S. PATENT DOCUMENTS

| 2,574,762 A | | 11/1951 | Schell | |
| 3,653,630 A | | 4/1972 | Ritsema | |
| 4,522,372 A | * | 6/1985 | Yano et al. | 251/129.15 |

FOREIGN PATENT DOCUMENTS

| DE | 1205623 | 11/1960 |
| DE | 1205623 | 11/1965 |
| DE | 3310021 | 9/1984 |
| DE | 4020951 | 1/1992 |
| DE | 4126672 | 2/1993 |
| DE | 4405915 | 8/1995 |
| DE | 19600351 | 7/1997 |
| DE | 19622983 | 11/1997 |
| DE | 19632379 | 2/1998 |
| DE | 19716856 | 10/1998 |
| DE | 29521959 | 1/1999 |
| DE | 19754525 | 4/1999 |
| DE | 19834522 | 2/2000 |
| EP | 0482398 | 4/1992 |
| FR | 2626711 | 8/1989 |

OTHER PUBLICATIONS

Search Report of German Patent Office for Appln 10016600.8.

* cited by examiner

Primary Examiner—John Bastianelli
(74) Attorney, Agent, or Firm—Honigman, Miller, Schwartz and Cohn LLP

(57) ABSTRACT

The present invention relates to an electromagnet valve including a valve housing in which a valve closure member is movably guided, a magnet armature fitted to the valve closure member and executing a stroke movement in the direction of a magnet core arranged in the valve housing in dependence on the electromagnetic excitation of a valve coil fitted on the valve housing, and a spring which, in the electromagnetically non-excited valve position, positions the magnet armature at a defined axial distance from the magnet core so that the magnet armature is separated from the magnet core by an interspace. In addition to spring, a spring element is interposed between the end surface of the magnet armature and the end surface of the magnet core.

10 Claims, 4 Drawing Sheets

ELECTROMAGNET VALVE

TECHNICAL FIELD

The present invention generally relates to valves and more particularly relates to an electromagnet valve.

BACKGROUND OF THE INVENTION

DE 197 16 856 A1 discloses an electromagnet valve of the generic type wherein a non-magnetic plate on which the resetting spring of the magnet armature is supported is interposed between the magnet armature and the magnet core. The plate is non-magnetic to prevent the so-called sticking of the magnet armature on the magnet core that is due to the residual magnetism in the magnet. By using a non-magnetic plate, a relatively large residual air slot is caused by the non-magnetic plate which cannot be minimized. The total air slot which has to be bridged at the beginning of an electromagnetic excitation is accordingly increased by the residual air/ The increased air slot means that a greater exciting current in the valve coil must be used to effectuate valve tappet movement.

In view of the above, an object of the present invention is to improve upon an electromagnetic valve of the generic type and maintain a simplest possible design in such a way that either a significant force increase of the magnetic drive occurs with a constant exciting current already at the commencement of the electromagnetic excitation, or that the electromagnetic valve can be operated, as requested or required, also with a minimum possible exciting current, and that a low-noise switching operation is ensured in both alternative modes of operations.

DETAILED DESCRIPTION OF THE PREFERRED EMBODIMENTS

Figure 1:
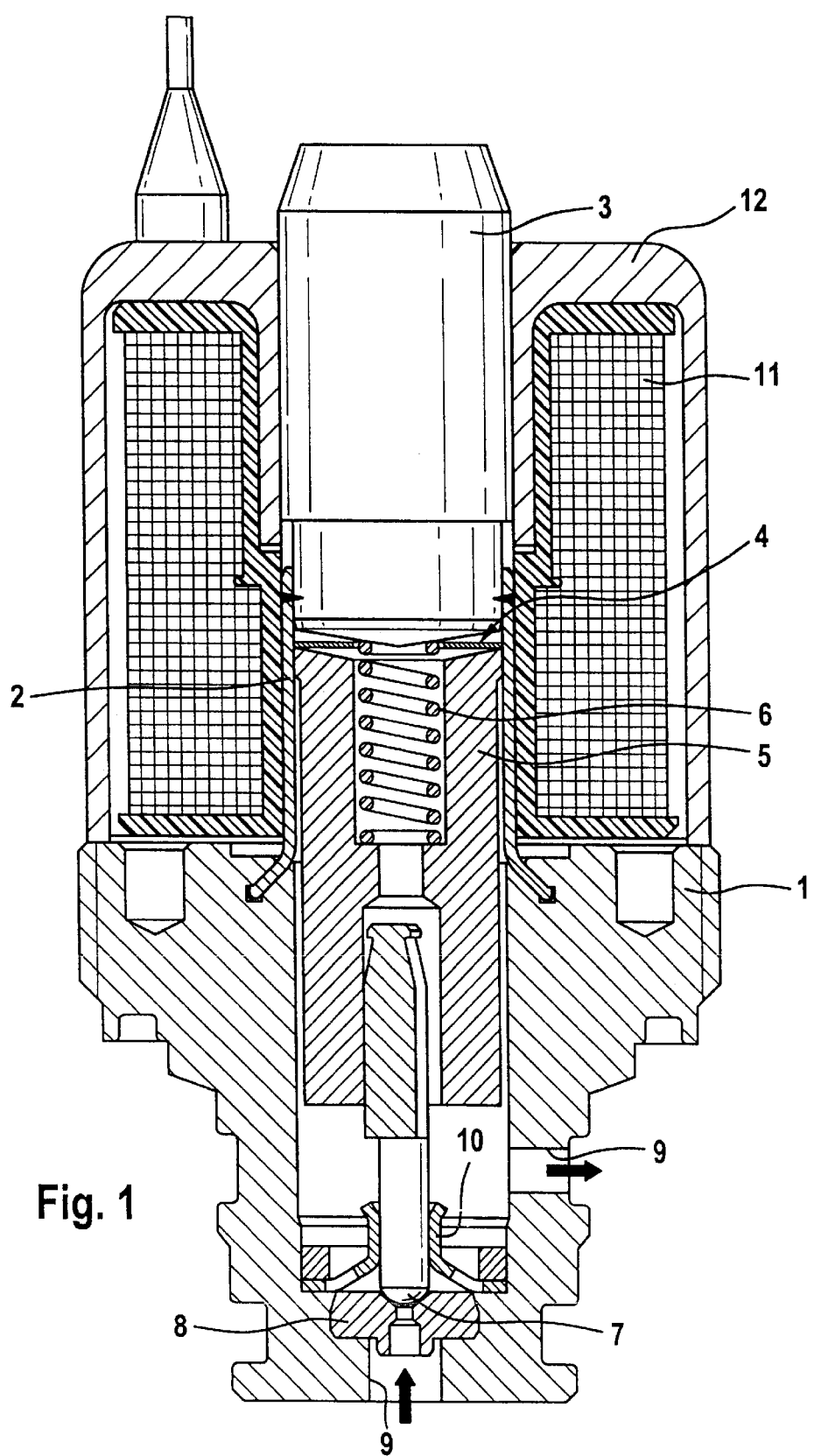
FIG. 1 is a longitudinal cross-section taken through an electromagnetic valve that is normally closed in its basic position.

The embodiment of FIG. 1 shows an electromagnetic valve which is normally closed in its basic position, valve housing 1 of which is exemplarily configured in the type of a cartridge. The central portion of the valve housing 1 is designed as a thin-walled valve sleeve 2 which is closed from the outside by a cylinder-shaped magnet core 3 in the form of a closure plug. Below the magnet core 3, there is an annular spring element 4 which loosely abuts on the outside edge of the concavely shaped end surface of the piston-type magnet armature 5. The thickness of the spring element 4 corresponds to the necessary rate of strength so that in the electromagnetically non-excited switching position of the valve, as shown in the drawings, the distance between the end surface of the magnet armature and the convex end surface of the magnet core is defined by the thickness of the spring element 4 and by the operative air slot which corresponds to the possible magnet armature stroke X.

Inside a stepped bore, the magnet armature 5 receives a spring 6 with a linear course of the characteristic curve which extends as a helical spring with its coil end through the opening in the spring element 4 onto the end surface of the magnet core 3. Consequently, magnet armature 5 is urged by the effect of spring 6 with the tappet-shaped valve closure member 7 against a valve seat 8 in the valve housing 1, with the result that a pressure fluid channel 9 which penetrates the valve housing 1 in the horizontal and vertical directions is interrupted in the valve's basic position. The tappet-shaped valve closure member 7 is fixed in the stepped bore of the magnet armature 5, preferably by means of a press fit, and centered at its end portion close to the valve seat 8 in a guide sleeve 10 which is jammed in the valve housing 1 concentrically relative to the valve seat 8.

By way of a valve coil 11 fitted to the valve housing 1 and a yoke ring 12 that partly encloses the valve coil 11, the magnetic circuit can be closed by energizing the valve coil 11 so that the magnet armature 5 moves in the direction of the magnet core 3. Thereby, the spring element 4 is elastically deformed and moves into abutment on the magnet core 3 where it abuts with its full surface on the illustrated inclined end surfaces of the magnet core 3 and the magnet armature 5. A spring force of the spring element 4 that is opposed to the movement of the magnet armature 5 will act so that the magnet armature 5 is automatically braked before it can urge the spring element 4 with its full surface against the end surface of the magnet core 3, which permits reducing, among others, the switching noise of the electromagnet.

Besides, the preloading force of the spring element 4 effects a quickest possible resetting of the magnet armature 5 out of the end position on the magnet core 3 after the electromagnetic excitation is completed because the resetting tendency of the spring element 4 counteracts the retaining force that is induced by remanence.

It must be taken into consideration in this respect that the resetting force of the spring 6 (which is always necessary in an electromagnet valve to return the magnet armature 5 to the basic position when the excitation discontinues, on the one hand, and which previously also served to overcome the residual magnetism, on the other hand) can be reduced considerably due to the arrangement and use of the spring element 4 according to the present invention. It is advantageous that the effect of the magnetic force is automatically boosted during the electromagnetic excitation, while the residual magnetism after termination of the excitation is reliably overcome by the force effect of the spring element 4 which is active only in the last part of the valve stroke, i.e., only when the magnet armature 5 approaches the magnet core 3.

Designing the spring element 4 as a particularly flat spring washer which is supported on inclined end surfaces or designing the spring as a cup spring, favorably, permits achieving a progressive spring characteristic curve which allows an analog or proportional operation of the electromagnet valve by way of the actual design of the electromagnet valve as a two-position valve. More specifically, the progressive spring element 4 causes a linearization of the magnet armature force.

To illustrate the present invention, the enlarged view of the magnet core portion and the magnet armature portion according to FIG. 2 shall be referred to hereinbelow which depicts the two end positions of the magnet armature 5 in a joint view by making reference to the normally closed electromagnet valve according to FIG. 1.

Figure 2:
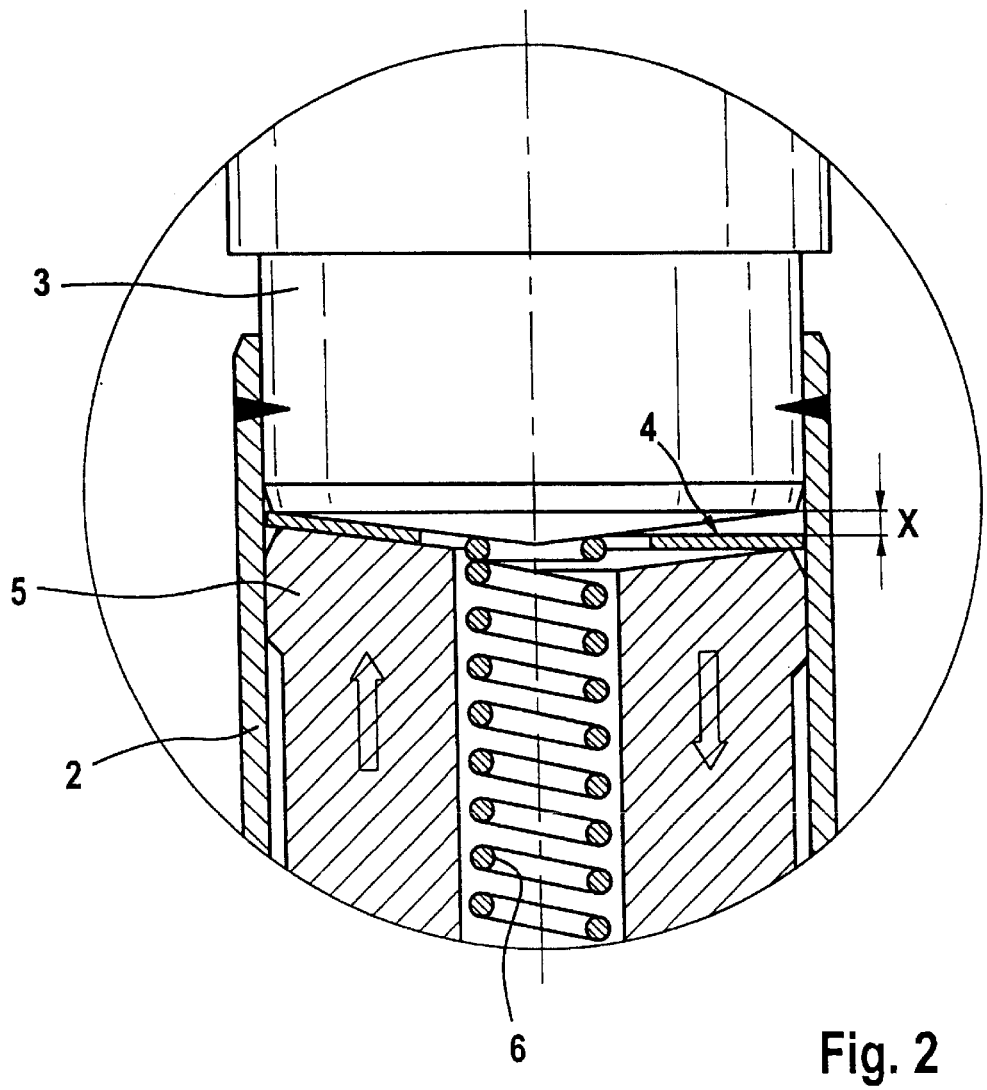
FIG. 2 is an enlarged view of the details of the electromagnetic valve of FIG. 1 that are essential to the present invention.

In consideration of the explanations given with respect to FIG. 1, magnet armature 5 can be clearly seen in detail in FIG. 2 on the right side of the valve's longitudinal axis in an electromagnetically non-excited switching position in which the plate-shaped spring element 4 merely abuts on the outside edge of the concavely shaped end surface of the magnet armature so that the spring element 4, in the area of the opening that contains spring 6, is remote from the convexly shaped end surface of the magnet core 3. The air slot between the top edge of the spring element 4 and the end surface of the magnet core 3 thus corresponds to the maximum magnet armature stroke X which is bridged by the magnet armature 5 in the electromagnetically excited valve switching position illustrated on the left side of the valve's longitudinal axis. In the left half of the view, the spring element 4 is hence elastically biassed and abuts with its full surface on the inclined end surfaces of the magnet armature 5 and the magnet core 3, and the thickness of the magnetic spring element 4 does not inhibit the magnetic flux, it rather bridges it in a favorable fashion.

Figure 3:
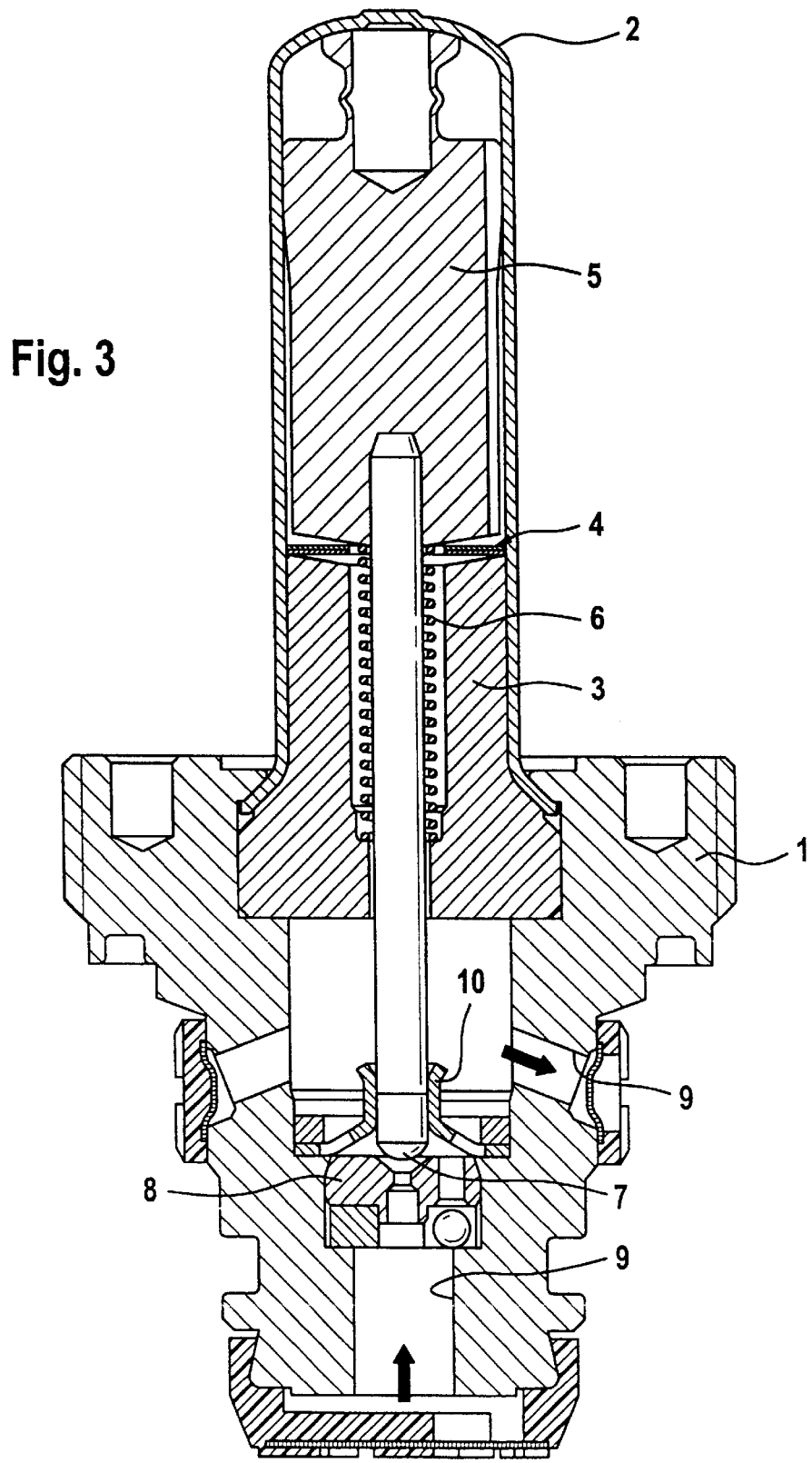
FIG. 3 is a longitudinal cross-section taken through an electromagnetic valve that is normally open in its basic position.

Different from the descriptions in FIGS. 1 and 2, FIG. 3 shows an application of the idea underlying this invention for an electromagnetically non-excited, normally open electromagnet valve. Based on the already described design of the valve housing 1 with valve seat 8 integrated therein, with pressure fluid channel 9 and guide sleeve 10 according to the illustration explained in FIG. 1, the magnet core 3 configured as a hollow cylinder is inserted into the bottom end portion of valve sleeve 2 which is secured to the magnet core 3 by means of an outside calked portion of the valve housing. The tappet-shaped portion of valve closure member 7 consequently extends through the magnet core 3 in the direction of the closed area of valve sleeve 2 until into magnet armature 5. The end surface of armature 5 is convexly shaped in the direction of the pair of spring elements 4, shown exemplarily, and the end surface of magnet core 3 disposed beneath the spring elements 4 has a concave shape. A spring 6 arranged in the through-bore of the magnet core 3 maintains the magnet armature 5 in abutment on the valve dome in the electromagnetically non-excited basic position, whereby the valve closure member 7 establishes an unhindered pressure fluid passage by way of pressure fluid channel 9. In this valve position, the spring elements 4 which are combined to form a spring assembly abut loosely on the projecting outside edge of the end surface of the magnet core so that a sufficiently large axial distance between magnet armature 5 and magnet core 3 remains to execute the valve stroke similarly to the explanation of the electromagnet valve according to FIG. 1. As has already been mentioned, spring element 4 can be composed of the series arrangement of several individual spring washers which, in the electromagnetically energized valve closing position, are compressed elastically between the end surfaces of the magnet armature 5 and the magnet core 3 with almost full surfaces, to ensure a reliable closing of the valve closure member 7.

Figure 4:
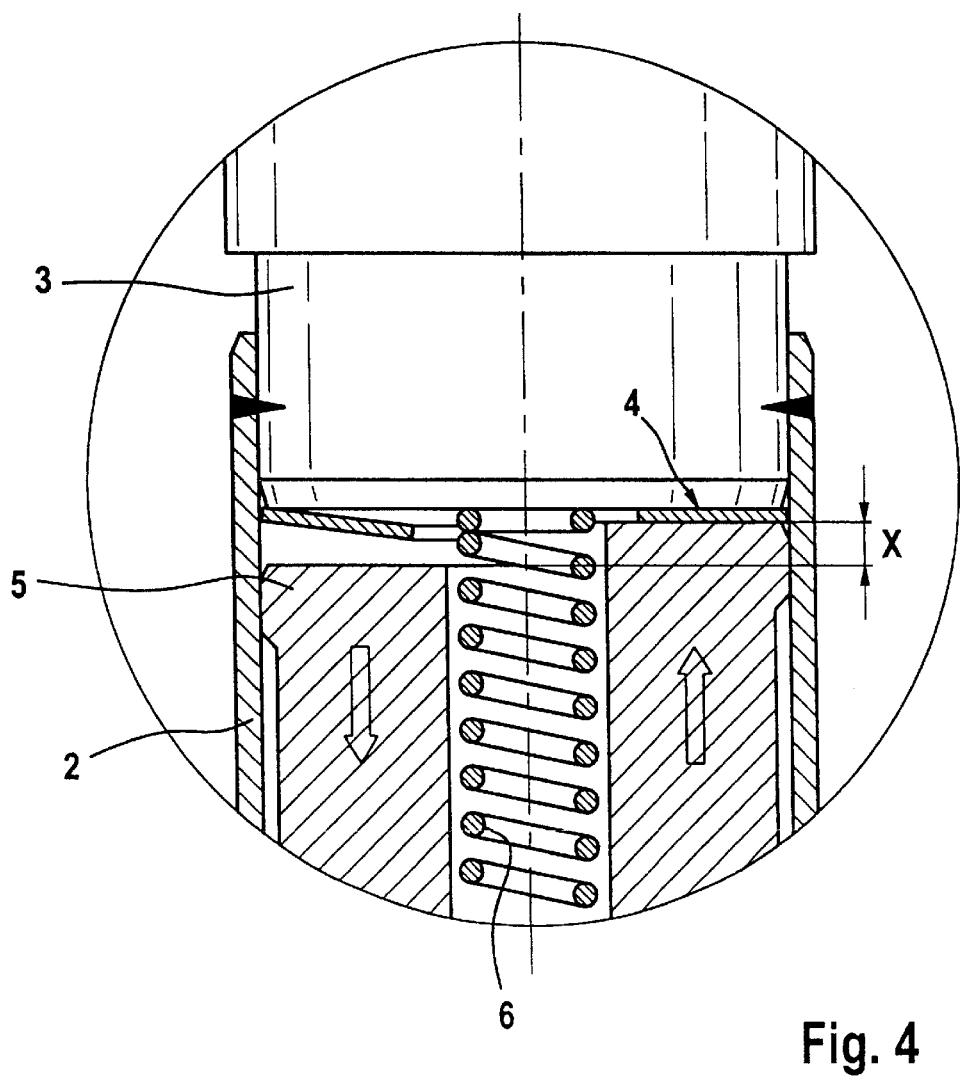
FIG. 4 is a constructive variation compared to the details shown in FIG. 2.

Different from the embodiments according to FIGS. 1 to 3 referred to hereinabove, FIG. 4 discloses using a curved spring element 4 in the shape of a cup spring, as mentioned already hereinabove, which additionally simplifies the manufacture of magnet armature 5 and magnet core 3 because now plane, i.e., horizontally extending end surfaces on the magnet armature 5 and magnet core 3, instead of the inclined end surfaces, face the spring element 4. In the practice, however, the manufacture of a cup spring is more sophisticated and less precise than the manufacture of the flat plate-type washer described hereinabove. Reference is made to the above-mentioned FIGS. 1 to 3 with regard to the functioning and further technical details of the subject matter of FIG. 4.

Attention should also be paid that for a proper functioning, the electromagnet valves according to FIGS. 1 to 4 must be acted upon hydraulically from the direction of the pressure fluid channel 9 that opens vertically into the valve housing 1 so that the inlet-side pressure fluid always prevails at the end surface of the valve closure member 7, irrespective of whether the valve closure member 7 adopts the open or closed position. Consequently, the pressure fluid leaves the valve housing 1 exclusively through the pressure fluid channel 9 which extends crossly out of valve housing 1.

Summarizing, it can be pointed out with respect to the examples described above that the use of the plate-shaped, relatively stiff spring element 4 that conducts the magnetic flux is considered as essential feature of the present invention. Said spring element, in the initially non-excited magnetic circuit, is ineffective and will be elastically compressed by the magnet armature 5 and urged with approximately its full surface against the magnet core 3 only when it is electromagnetically energized at the end of the maximum performable valve stroke. Because the preferably ferritic spring element 4 is no obstacle for the magnetic circuit when the spring element 4 abuts with its full surface on the magnet core 3 in the electromagnetically energized end position of the magnet armature 5, the working stroke X corresponds quasi to the air slot being bridged by the magnet armature 5, that means, a residual air slot, as known from the state of the art, weakening the magnetic circuit does not exist. Additionally, after completion of the electromagnetic excitation, the spring element 4 due to its elastic preload applies a resetting force to the magnet armature 5 which counteracts the residual magnetism and, thus, prevents the undesirable sticking of the magnet armature. Thus, the present invention brings about an effective rise in the magnetic force at the beginning of the excitation of the magnet armature 5 because the working stroke X now corresponds to the air slot that must be bridged.

Irrespective of the embodiment of the above-mentioned electromagnet valves which is chosen in the individual case, it principally applies that the spring force of the spring element 4 is at least as great as the magnet force induced by remanence. Besides, the present invention is to be interpreted so that the necessary valve coil current for operating the electromagnet valve can be reduced by the spring element 4 which conducts the magnetic flux and the possible force reduction of spring 6.

What is claimed is:
1. Electromagnet valve, comprising:
   a valve housing,
   a valve closure member movably guided in said valve housing,
   a magnet armature fitted to the valve closure member and executing a stroke movement in the direction of a magnet core arranged in the valve housing in dependence on the electromagnetic excitation of a valve coil fitted on the valve housing, and
   a spring which, in the electromagnetically non-excited valve position, positions the magnet armature at a defined axial distance from the magnet core so that the magnet armature is separated from the magnet core by an interspace, wherein in addition to said spring, a spring element is interposed between the end surface of the magnet armature and the end surface of the magnet core, wherein the magnet core and the magnet armature include either convexly or concavely shaped end surfaces between which resides a plate-shaped spring element with a lever arm resiliently mounted on the end surface of said magnetic armature or the end surface of the magnet core.

2. Electromagnet valve as claimed in claim 1, wherein a spring resetting force of the spring element, after termination of the excitation of the electromagnet valve, is at least as great as the force induced by remanence.

3. Electromagnet valve as claimed in claim 1, wherein the spring element is configured as an annular washer which, in the electromagnetically non-excited valve switching position, wherein its outside edge abuts either on the projecting end surface of the magnet core or the projecting end surface of the magnet armature.

4. Electromagnet valve as claimed in claim 1, wherein the spring element, spring, magnet core, and magnet armature are aligned coaxially relative to a longitudinal axis of the valve.

5. Electromagnet valve as claimed in claim 1, wherein the spring element is arranged with a clearance between the magnet core and the magnet armature in the electromagnetically non-excited valve switching position.

6. Electromagnet valve as claimed in claim 1, wherein the spring element, in the electromagnetically excited valve switching position, is pressed by the magnet armature against the magnet core in opposition to the effect of the a preloading force of said spring.

7. Electromagnet valve as claimed in claim 1, wherein the spring element is composed of a material which conducts the magnetic flux.

8. Electromagnet valve as claimed in claim 1, wherein the spring element is a cup spring which is arranged between uncurved end surfaces of the magnet core and the magnet armature.

9. Electromagnet valve as claimed in claim 1, wherein the spring element is configured as a plate and wherein the center of the plate is penetrated by a coil spring.

10. Electromagnet valve, comprising:

a valve housing, a valve closure member movably guided in said valve housing, a magnet armature fitted to the valve closure member and executing a stroke movement in the direction of a magnet core arranged in the valve housing in dependence on the electromagnetic excitation of a valve coil fitted on the valve housing, and a spring which, in the electromagnetically non-excited valve position, positions the magnet armature at a defined axial distance from the magnet core so that the magnet armature is separated from the magnet core by an interspace, wherein in addition to said spring, a spring element is interposed between the end surface of the magnet armature and the end surface of the magnet core, wherein the spring element is configured as a plate and wherein the center of the plate is penetrated by a coil spring.

* * * * *